April 19, 1927.  
J. H. BOURGON  
VENTILATOR  
Filed July 3, 1924  
1,624,907  
2 Sheets-Sheet 2
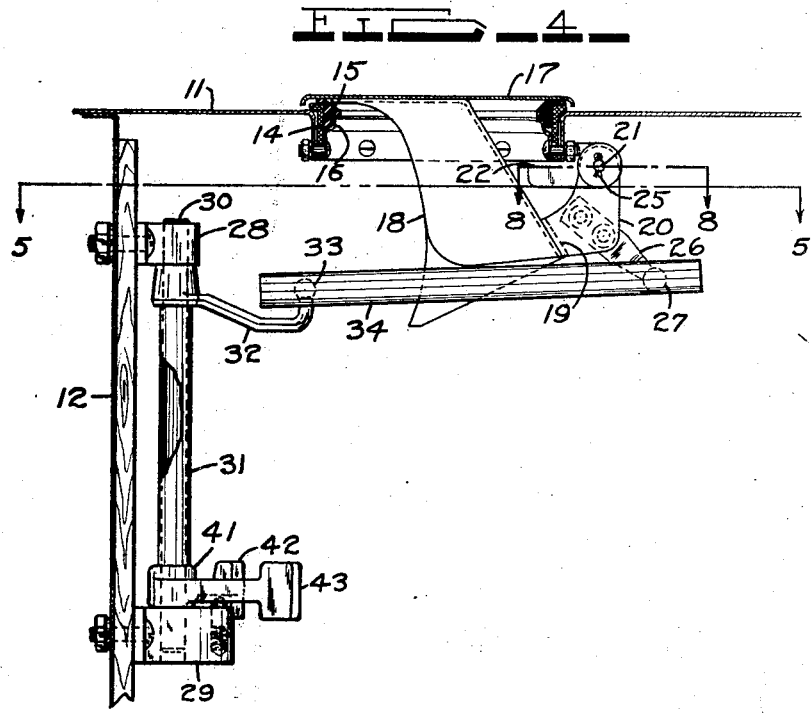
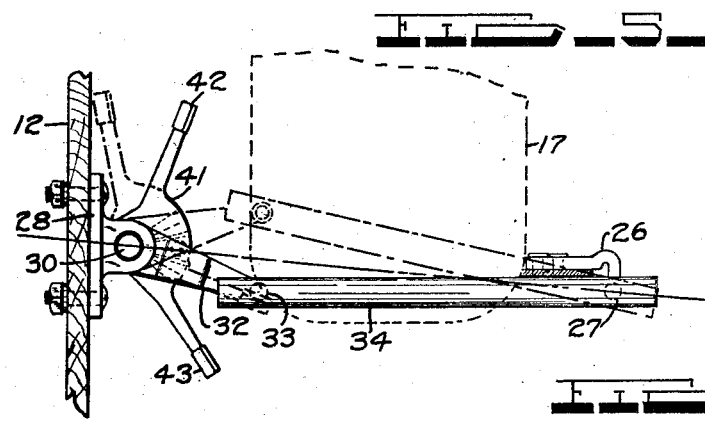
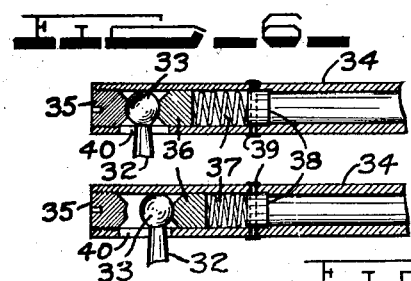
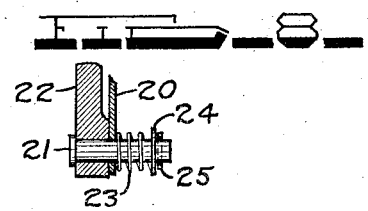
INVENTOR  
JOSEPH H. BOURGON  
BY  
ATTORNEY Patented Apr. 19, 1927.

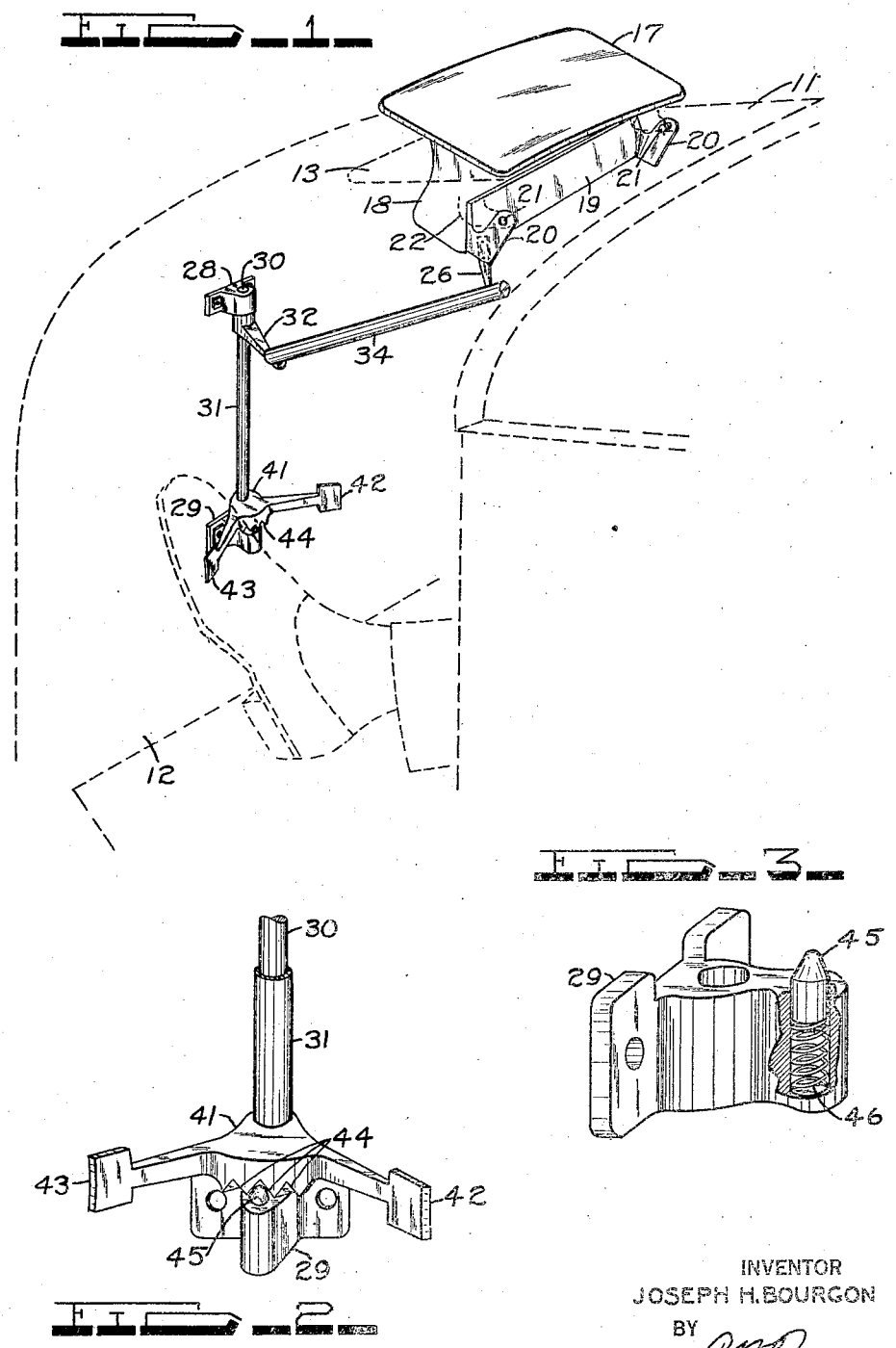

1,624,907

UNITED STATES PATENT OFFICE.

JOSEPH H. BOURGON, OF DETROIT, MICHIGAN, ASSIGNOR TO THE STUDEBAKER CORPORATION, OF SOUTH BEND, INDIANA, A CORPORATION OF NEW JERSEY.

VENTILATOR.

Application filed July 3, 1924. Serial No. 723,890.

This invention relates to means for ventilating automobiles and more particularly to that type of ventilators generally known as "cowl" ventilators.

Heretofore such ventilators have been operated, that is to say, opened or closed, either by means of a handle projecting below the lower edge of the automobile instrument board, or by means of a rotatable knob projecting through the instrument board. Such means are usually placed in such a position that the driver of the automobile must materially change his position to operate the same, and while in such a position which is usually awkward, the control of the car may be lost with resulting danger to it and its occupants.

It is the principal object of the present invention to provide a ventilator for automobiles which will not necessitate any material change in position of the driver thereof to operate the same.

Another object is to provide a cowl ventilator for automobiles that will be easily and quickly operable solely by the driver's foot.

Another object is to provide novel means for operating a cowl ventilator and for resiliently holding the same in adjusted position.

A further object is to provide means for operating a cowl ventilator which will prevent unauthorized opening of the same from the exterior of the automobile when the ventilator is in full closed position.

A still further object is to provide a cowl ventilator for automobiles which is operable by means of pedals supported on the dash of the automobile, the pedals being suitably connected by linkages to the ventilator so that upon pressure being applied by the driver's foot to one pedal or another the position of the ventilator will be caused to be changed.

The above being among the objects of the present invention, the same consists of certain features of construction and combination of parts to be hereinafter described with reference to the accompanying drawings, and then claimed, having the above and other objects in view.

In the accompanying drawings which illustrate a suitable embodiment of the present invention, and in which like numerals refer to like parts throughout the several different views.

Figure 1 is a perspective view of the ventilator and actuating means therefor embodying the present invention, the relative positions of the automobile in respect thereto and the position of the driver's foot in operative position relative thereto being shown in dotted lines.

Figure 2 is a perspective view of the operating pedals and co-operating mechanism.

Figure 3 is a partially broken perspective view of the lower supporting bracket for the pedal operated shaft, showing the spring pressed plunger utilized for holding the operating mechanism in a variety of open and closed positions of the ventilator.

Figure 4 is a partially broken side view of the mechanism embodying the present invention, showing the same in position on an automobile.

Figure 5 is a top view of the ventilator operating mechanism taken on the line 5—5 of Figure 4.

Figure 6 is a sectional view taken through one end of the drag link connecting the ventilator arm and the pedal operated arm, showing the parts in normal position when the ventilator is in open or partly open position.

Figure 7 is a sectional view corresponding to the view shown in Figure 6 but in which the parts are shown in the position they assume when the ventilator is in closed position.

Figure 8 is a broken view taken on the line 8—8 of Figure 4, showing the manner in which the ventilator is pivoted to the cowl of the automobile.

In the drawings the cowl of the automobile is indicated as 11 and the dash as 12. The cowl 11 is provided with an opening 13 in its upper surface, the metal about the opening 13 being bent downwardly to form a flange to which is secured the frame 14 which fits into the opening 13. The frame 14 carries adjacent its upper edge and projecting thereabove the resilient rubber strip 15, held in place in the frame 14 by the subframe 16. The ventilator cap or cover 17 which is adapted to close the opening 13 is provided on its under side with the deflector plate 18 along the back of which is secured the strip 19 whose ends are bent up to form the ears 20 which are pivotally connected by the pins 21 to the ears 22 projecting rearwardly from the frame 14, thereby pivotally securing the cover 17 to the cowl 11. Springs 23 surrounding the pins 21 are compressed between the ears 20 and the washers 24 held on the end of the pins 21 by the cotters 25 as clearly shown in Figure 8, thereby drawing the ears 20 and 22 in close relationship and preventing rattling of the parts. Secured to one of the ears 20, as shown, is an extending arm 26 provided at its free end with a ball 27.

Secured to the dash 12 by the bracket 28 at its upper end and the bracket 29 at its lower end is the vertical shaft 30. Rotatably mounted on the shaft 30 between the brackets 28 and 29 is the tubular sleeve 31 to the upper end of which is non-rotatably secured the arm 32 provided at its free end with a ball 33. Connecting the ball 33 with the ball 27 is a link composed of a tubular member 34, the opposite ends of which are identical and which are formed into sockets for receiving the balls 27 and 33. The construction of the socket ends is clearly shown in Figures 6 and 7 and comprises two ball socket members 35 and 36, the former of which is threadably received in the ends of the tube 34 and the other of which is slidably received in the end of the tube and is backed up by a spring 37 normally under compression between the socket member 36 and the plug 38 and tube 34. Elongated openings 40 in the side of the tube 34 permits entrance of the balls 27 and 33 therethrough and permits them to be positioned between the socket members 35 and 36, being held in that position between the curved end faces of the socket members by the pressure of the springs 37.

Non-rotatably secured to the lower end of the tube 31 in such a position as to be readily accessible to the foot of the driver is the pedal member 41 which is provided with two divergent pedals 42 and 43 which are adapted to be engaged by the foot of the driver and thereby cause rotation of the tube 31 in the desired direction.

The lower face of the member 41 is provided with a series of notches 44 which are adapted to be engaged by the vertically movable spring pressed plunger 45 confined in the bracket 29 and which is backed by a coil spring 46. The spring pressed plunger 45 engages the notches 44 and thereby resiliently holds the member 41 in adjusted position.

It will be evident that when the pedal 43 is moved towards the dash 12 by the pressure of the driver's foot which will cause the plunger 45 to be depressed, the tube 31 will be rotated in a like manner, causing the arm 32 to rotate about the axis of the tube 31 and also causing the ball 33 to approach the dash, drawing the ball 27 on the arm 26 of the ventilator after it and causing the ventilator to open. When pressure of the driver's foot is applied to the pedal 42 a reversal of the above movements will take place and the ventilator will be caused to close.

It is preferable to so construct the different parts that when the cover 17 drops down into contact with the rubber strip 15 the spring pressed plunger 45 will be so positioned in respect to one of the notches 44 that it will tend to cause further rotation of the member 41 in order to fully engage the notch 44. This will tend to further compress the springs 37 in the tube 34 and will cause the cover 17 to be drawn down tightly upon the rubber strip 15, thereby preventing entrance of water through the meeting surfaces and will effectually prevent vibration and rattling of the different parts of the mechanism.

Another preferable feature is to so construct the mechanism that upon pressing the pedal 42 as fully forward as possible, the ball 33 will pass across the line passing between the ball 27 and the axis of the tube 31, as is clearly shown in dotted lines in Figure 5, and will come up against some form of stop, such as the dash 12, which will hold it just over the line mentioned and not far enough to relieve the spring pressure described above which securely holds the cover 17 down on the rubber strip 15. The advantage of this feature is that any effort to open the cover 17 by raising the free edge thereof causes the linkages to assume their closed position more fully and effectually prevents the raising of the cover 17. This is particularly important in automobiles of the closed type where the locking of the doors is relied upon as a theft prevention means and in which the doors could be opened by an instrument inserted through the ventilator opening.

Formal changes may be made in the specific embodiment of the invention described without departing from the spirit or substance of the broad invention, the scope of which is commensurate with the appended claims.

What I claim is:—

1. In a motor vehicle, a cowl ventilator, an arm secured to said ventilator, a vertical rotatable shaft secured to the vehicle dash, an arm secured to the upper end of said shaft and rotatable therewith, a link connecting said arm on said vertical shaft and said arm on said ventilator, and pedals secured to the lower end of said shaft and rotatable therewith to operate said ventilator.

2. In a motor vehicle having a cowl and a dash, a ventilator pivoted to said cowl and provided with an arm, a vertical shaft rotatably supported on said dash and provided with a foot operable device at its lower end and an arm at its upper end, a link connecting said arms, and means for holding said parts in a plurality of different positions.

3. In a motor vehicle having a dash, a cowl, and a ventilator pivotally supported on said cowl, means for operating said ventilator comprising an arm rigidly secured thereto, a member pivotally supported on said dash, pedals secured to said member and projecting therefrom, said pedals having notches formed therein, and a bracket supporting said member secured to said dash, said bracket having a spring-pressed plunger mounted therein adapted to engage said notches whereby said ventilator can be retained in a plurality of different positions.

4. In a motor vehicle provided with a ventilator pivotally supported on the cowl thereof; an arm on said ventilator, a pivoted operating member provided with an arm, a connection pivotally connected to both arms, and means for causing the pivotal point between the arm on said member and said connection to pass over the line between the pivotal axis of said member and the pivotal point between said connection and said ventilator arm when said ventilator is in full closed position.

5. In a motor vehicle provided with a cowl ventilator having an arm extending therefrom, a vertical shaft pivoted to the dash of said vehicle, foot engaging means on said shaft, an arm secured to said shaft, a link connecting said arms whereby operation of said foot engaging means causes operation of said ventilator, and a stop for limiting the movement of said foot operating means in one direction when said ventilator is in full closed position, said arm on said shaft and said link normally operating on one side only of the plane passing through the axis of said shaft and the point of connection of said link and said ventilator arm, said arm on said shaft and said link being positioned on the opposite side of said plane when said ventilator is in full closed position.

6. In a motor vehicle, a cowl and a dash, an opening in said cowl, a pivotal cover for said opening provided with an arm, a vertically disposed shaft pivotally mounted on brackets secured to said dash, a member provided with pedals secured to said shaft, notches in said member, a spring pressed plunger carried by one of said brackets for engaging said notches, an arm non-rotatably secured to said shaft, balls on the free ends of said arms, and a member extending between said balls having resilient ball sockets for socketing said balls.

7. In a motor vehicle having a cowl and a dash, a ventilator pivotally supported on said cowl, pedals pivotally supported on said dash, resilient means for holding said pedals in a plurality of positions, and means connecting said pedals and ventilator to operate the latter comprising a rotatable shaft secured to said pedals, an arm secured to said ventilator, and a link resiliently connecting said shaft and arm, said resilient connection tending to further close said ventilator when in closed position.

Signed by me at Detroit, Michigan, U. S. A., this 27th day of June 1924.

JOSEPH H. BOURGON.